(12) United States Patent
Yang

(10) Patent No.: US 11,835,806 B2
(45) Date of Patent: Dec. 5, 2023

(54) BACKPLATE INCLUDING EDGE PORTIONS AND DISPLAY PANEL INCLUDING THE SAME

(71) Applicant: Shenzhen China Star Optoelectronics Semiconductor Display Technology Co., Ltd., Guangdong (CN)

(72) Inventor: Yuhua Yang, Guangdong (CN)

(73) Assignee: Shenzhen China Star Optoelectronics Semiconductor Display Technology Co., Ltd., Guangdong (CN)

( * ) Notice: Subject to any disclaimer, the term of this patent is extended or adjusted under 35 U.S.C. 154(b) by 486 days.

(21) Appl. No.: 17/051,220

(22) PCT Filed: Aug. 6, 2020

(86) PCT No.: PCT/CN2020/107265
§ 371 (c)(1),
(2) Date: Oct. 28, 2020

(87) PCT Pub. No.: WO2022/007083
PCT Pub. Date: Jan. 13, 2022

(65) Prior Publication Data
US 2022/0268989 A1    Aug. 25, 2022

(30) Foreign Application Priority Data
Jul. 9, 2020 (CN) .......................... 202010654624.0

(51) Int. Cl.
*G02F 1/1333* (2006.01)
*F21V 8/00* (2006.01)

(52) U.S. Cl.
CPC ..... *G02F 1/133314* (2021.01); *G02B 6/0088* (2013.01); *G02B 6/0091* (2013.01); *G02F 1/133328* (2021.01)

(58) Field of Classification Search
CPC ..................... G02F 1/133314; G02F 1/133332
See application file for complete search history.

(56) References Cited

U.S. PATENT DOCUMENTS

2013/0128183 A1   5/2013   Hsiao et al.
2014/0022486 A1*  1/2014   Kuo ........................ G09F 13/04
                                                                  211/26

(Continued)

FOREIGN PATENT DOCUMENTS

CN    101042485 A    9/2007
CN    101865434 A   10/2010

(Continued)

*Primary Examiner* — Keith G. Delahoussaye
(74) *Attorney, Agent, or Firm* — PV IP PC; Wei Te Chung; Zhigang Ma

(57) ABSTRACT

A backplate and a display panel are disclosed. The backplate includes a first transverse edge portion, a second transverse edge portion disposed opposite to the first transverse edge portion, a first longitudinal edge portion, and a second longitudinal edge portion disposed opposite to the first longitudinal edge portion. The first longitudinal edge portion is connected to the first transverse edge portion and the second transverse edge portion, the second longitudinal edge portion is connected to the first transverse edge portion and the second transverse edge portion, and an accommodation chamber is defined by the first transverse edge portion, the second transverse edge portion, the first longitudinal edge portion, and the second longitudinal edge portion.

16 Claims, 4 Drawing Sheets

(56) References Cited

U.S. PATENT DOCUMENTS

| | | | |
|---|---|---|---|
| 2014/0028947 A1 | 1/2014 | Kuo et al. | |
| 2014/0139784 A1* | 5/2014 | Kawada | G02F 1/133308 |
| | | | 349/58 |
| 2016/0033808 A1* | 2/2016 | Huang | H05K 5/02 |
| | | | 361/679.01 |
| 2017/0269423 A1 | 9/2017 | Zhang et al. | |
| 2019/0246816 A1 | 8/2019 | Durrant | |
| 2019/0383994 A1* | 12/2019 | Zhang | G02F 1/133608 |

FOREIGN PATENT DOCUMENTS

| | | |
|---|---|---|
| CN | 102155687 A | 8/2011 |
| CN | 102645787 A | 8/2012 |
| CN | 102778784 A | 11/2012 |
| CN | 102830517 A | 12/2012 |
| CN | 104020591 A | 9/2014 |
| CN | 204406921 U | 6/2015 |
| CN | 204925563 U | 12/2015 |
| CN | 206249814 U | 6/2017 |
| CN | 108037617 A | 5/2018 |
| CN | 209842279 U | 12/2019 |
| JP | 2008009679 A | 1/2008 |

* cited by examiner

BACKPLATE INCLUDING EDGE PORTIONS AND DISPLAY PANEL INCLUDING THE SAME

BACKGROUND OF INVENTION

1. Field of Invention

The present invention relates to a technical field of displays, and particularly to, a backplate and a display panel.

2. Related Art

With development of communication technology, electronic devices such as smart phones are becoming more and more popular. There is an increasing demand for bar-shaped screens in current markets for various scenarios, such as square display screens, publicity display screens, and advertising screens. Users' demand for size of bar-shaped screens is relatively scattered, and a total demand is not large, so industries generally only mass-produces some major-sized bar-shaped screens.

However, different sizes of bar-shaped screens require different sizes of backplates, and different sizes of backplates need multiple sets of different molds for production, so the production cost is relatively high.

A technical problem is that in current bar-shaped screens, different sizes of bar-shaped screens require different sizes of backplates, and different sizes of backplates need to be produced by multiple sets of different molds, resulting in relatively high production cost.

SUMMARY OF INVENTION

In a first aspect, the present invention is to provide a backplate, comprising a first transverse edge portion extending along a first direction; a second transverse edge portion disposed opposite to the first transverse edge portion; a first longitudinal edge portion extending along a second direction; a second longitudinal edge portion disposed opposite to the first longitudinal edge portion; wherein the first longitudinal edge portion is connected to the first transverse edge portion and the second transverse edge portion, the second longitudinal edge portion is connected to the first transverse edge portion and the second transverse edge portion, and an accommodation chamber is defined by the first transverse edge portion, the second transverse edge portion, the first longitudinal edge portion, and the second longitudinal edge portion.

In one embodiment, the first transverse edge portion comprises a first support plate and a first bent portion disposed on the first support plate, the second transverse edge portion comprises a second support plate and a second bent portion disposed on the second support plate, the first longitudinal edge portion comprises a first retaining wall disposed corresponding to a first end of each of the first transverse edge portion and the second transverse edge portion, and the second longitudinal edge portion comprises a second retaining wall disposed corresponding to a second end of each of the first transverse edge portion and the second transverse edge portion, wherein the accommodation chamber is enclosed by the first bent portion, the second bent portion, the first retaining wall, and the second retaining wall.

In one embodiment, a first slot is defined between the first bent portion and the first support plate, and a second slot provided opposite to the first slot is defined between the second bent portion and the second support plate.

In one embodiment, the first longitudinal edge portion further comprises a first bottom plate connected to the first support plate and the second support plate, and the first retaining wall is disposed on the first bottom plate, wherein the second longitudinal edge portion further comprises a second bottom plate connected to the first support plate and the second support plate, and the second retaining wall is disposed on the second bottom plate.

In one embodiment, the first bottom plate and the second bottom plate are both disposed on rear sides of the first support plate and the second support plate.

In one embodiment, each of the first support plate and the second support plate is provided with a first fixing hole, and each of the first bottom plate and the second bottom plate is provided with a second fixing hole corresponding to the first fixing hole.

In one embodiment, the first retaining wall is strip-like in shape in cross-section.

In one embodiment, the backplate further comprises an edge shielding portion connected to the first longitudinal edge portion, wherein the edge shielding portion comprises an edge shielding plate disposed on a side of the first retaining wall away from the first bottom plate.

In one embodiment, the second retaining wall is L-like in shape in cross-section.

In a second aspect, the present application further provides a display panel, comprising a display screen; a backlight module disposed on a rear side of the display screen and comprising a light source, an optical element, and a backplate; wherein the optical element is insertably disposed between a first slot and a second slot provided by the backplate, and the light source is disposed on an inner side of the backplate and is located at a side portion of the optical element.

In a third aspect, the present application further provides a backplate, comprising a first transverse edge portion extending along a first direction; a second transverse edge portion disposed opposite to the first transverse edge portion; a first longitudinal edge portion extending along a second direction; a second longitudinal edge portion disposed opposite to the first longitudinal edge portion; wherein the first longitudinal edge portion is connected to the first transverse edge portion and the second transverse edge portion, the second longitudinal edge portion is connected to the first transverse edge portion and the second transverse edge portion, and an accommodation chamber is defined by the first transverse edge portion, the second transverse edge portion, the first longitudinal edge portion, and the second longitudinal edge portion; wherein the first transverse edge portion is integrally formed with one of the first longitudinal edge portion or the second longitudinal edge portion, and the second transverse edge portion is integrally formed with another one of the first longitudinal edge portion or the second longitudinal edge portion.

In one embodiment, the first transverse edge portion comprises a first support plate and a first bent portion disposed on the first support plate, the second transverse edge portion comprises a second support plate and a second bent portion disposed on the second support plate, the first longitudinal edge portion comprises a first retaining wall disposed corresponding to a first end of each of the first transverse edge portion and the second transverse edge portion, and the second longitudinal edge portion comprises a second retaining wall disposed corresponding to a second end of each of the first transverse edge portion and the second transverse edge portion, wherein the accommodation chamber is enclosed by the first bent portion, the second bent portion, the first retaining wall, and the second retaining wall.

In one embodiment, a first slot is defined between the first bent portion and the first support plate, and a second slot provided opposite to the first slot is defined between the second bent portion and the second support plate.

In one embodiment, the first support plate and the second support plate are arranged side by side, and a surface of the first support plate is flush with a corresponding surface of the second support plate.

In one embodiment, the first longitudinal edge portion further comprises a first bottom plate connected to the first support plate and the second support plate, and the first retaining wall is disposed on the first bottom plate, wherein the second longitudinal edge portion further comprises a second bottom plate connected to the first support plate and the second support plate, and the second retaining wall is disposed on the second bottom plate.

In one embodiment, the first bottom plate and the second bottom plate are both disposed on rear sides of the first support plate and the second support plate.

In one embodiment, each of the first support plate and the second support plate is provided with a first fixing hole, and each of the first bottom plate and the second bottom plate is provided with a second fixing hole corresponding to the first fixing hole.

In one embodiment, the first retaining wall is strip-like in shape in cross-section.

In one embodiment, the backplate further comprises an edge shielding portion connected to the first longitudinal edge portion, wherein the edge shielding portion comprises an edge shielding plate disposed on a side of the first retaining wall away from the first bottom plate.

In one embodiment, the second retaining wall is L-like in shape in cross-section.

The present application has advantageous effects as follows: a backplate is constructed with a plurality of modules to form an accommodation chamber for accommodating an optical element of a display panel. The size of the accommodation chamber can be changed by only adjusting the length dimensions of the first transverse edge portion, the second transverse edge portion, the first lateral edge portion, and second lateral edge portion while keeping the width dimensions of these edge portions unchanged. Accordingly, the backplate is adapted to optical elements of different sizes and to be assembled with displays of different sizes. The modules, including the first transverse edge portions of different length dimensions, can all be produced using the same set of molds, thereby saving mold costs, reducing product development cycles, significantly lowering mold costs in a backplate production process, and facilitating production of small batch products and various types of products, as well as improving product response times.

BRIEF DESCRIPTION OF DRAWINGS

The following detailed description of specific implementations of the present application in conjunction with the accompanying drawings will make the technical solutions and other beneficial effects of the present application obvious.

DESCRIPTION OF PREFERRED EMBODIMENTS

Figure 1:
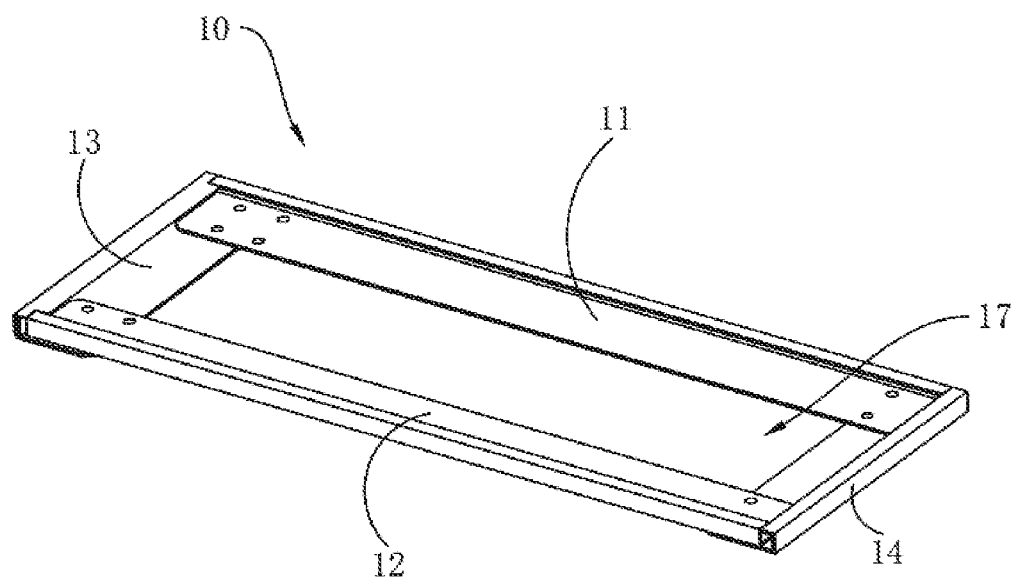
FIG. 1 is a schematic structural view of a backplate in accordance with an embodiment of the present application.

The following embodiments are referring to the accompanying drawings for exemplifying specific implementable embodiments of the present invention. Directional terms described by the present invention, such as upper, lower, front, back, left, right, inner, outer, side, etc., are only directions by referring to the accompanying drawings, and thus the used directional terms are used to describe and understand the present invention, but the present invention is not limited thereto. In the drawings, units with similar structures are indicated by the same reference numerals.

An object of the present application is to overcome a technical problem that in current bar-shaped screens, different sizes of bar-shaped screens require different sizes of backplates, and different sizes of backplates need to be produced by multiple sets of different molds, resulting in relatively high production cost.

Figure 2:
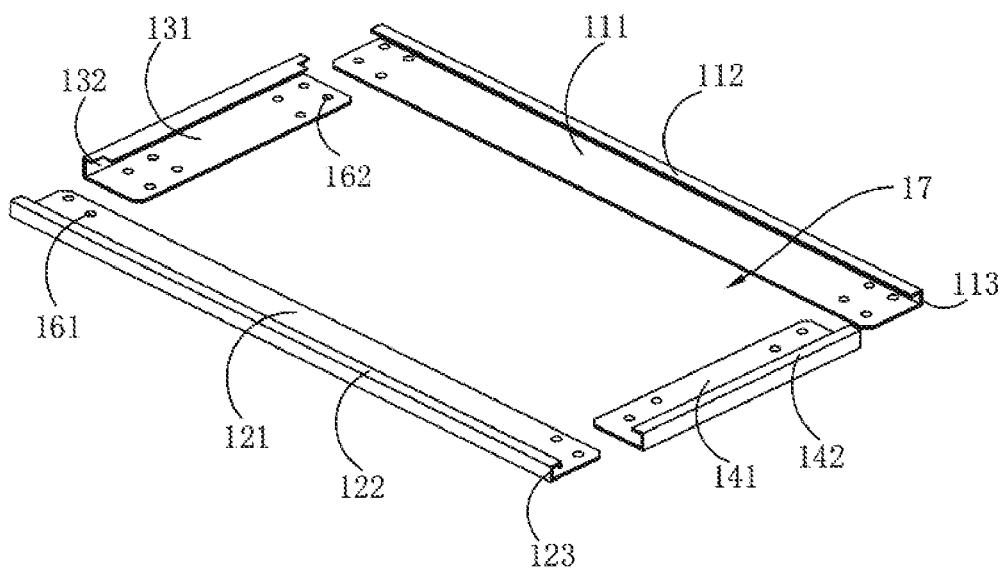
FIG. 2 is a schematic assembly view of each component of a backplate in accordance with an embodiment of the present application.

The present application provides a backplate as shown in FIGS. 1 and 2. A backplate 10 includes a first transverse edge portion 11 extending along a first direction, a second transverse edge portion 12 disposed opposite to the first transverse edge portion 11, a first lateral edge portion 13 extending along a second direction, and a second lateral edge portion 14 disposed opposite to the first lateral edge portion 13.

The first lateral edge portion 13 is connected to the first transverse edge portion 11 and the second transverse edge portion 12, the second lateral edge portion 14 is connected to the first transverse edge portion 11 and the second transverse edge portion 12. An accommodation chamber 17 is formed and surrounded by the first transverse edge portion 11, the second transverse edge portion 12, the first lateral edge portion 13, and the second lateral edge portion 14.

It should be noted that the first direction may be perpendicular to the second direction. The backplate 10 is divided into a plurality of modules including the first transverse edge portion 11, the second transverse edge portion 12, the first lateral edge portion 13, and the second lateral edge portion 14. By using the backplate 10 constructed with the modules, and the accommodation chamber 17 formed in the backplate 10 for accommodating an optical element of the display panel, the present application is capable of adjusting size of the accommodation chamber 17 without changing width of the first transverse edge portion 11, the second transverse edge portion 12, the first lateral edge portion 13, and the second lateral edge portion 14, but only with length adjustments of the first transverse edge portion 11, the second transverse edge portion 12, the first lateral edge portion 13, and the second lateral edge portion 14, so that the backplate is adapted to optical elements of different sizes and to be assembled with displays 40 of different sizes. The modules having different lengths, such as the first transverse edge portion 11 and the other modules, can be produced with a same mold, thereby saving mold costs, reducing product development cycles, significantly lowering mold costs in a backplate production process, and facilitating production of small batch products and various types of products, as well as improving product response times.

Specifically, the first transverse edge portion 11 may be integrally formed with the first lateral edge portion 13 or the second lateral edge portion 14. The second transverse edge portion 12 may be integrally formed with another one of the first lateral edge portion 13 or the second lateral edge portion 14. The first transverse edge portion 11, the second transverse edge portion 12, the first lateral edge portion 13, and the second lateral edge portion 14 may also be independent from each other.

Specifically, the first transverse edge portion 11, the second transverse edge portion 12, the first lateral edge portion 13, and the second lateral edge portion 14 may be made of materials having advantages of strong plasticity, being light and thin, and cheap, and having certain strength and hardness, such as aluminum alloy.

Figure 3:
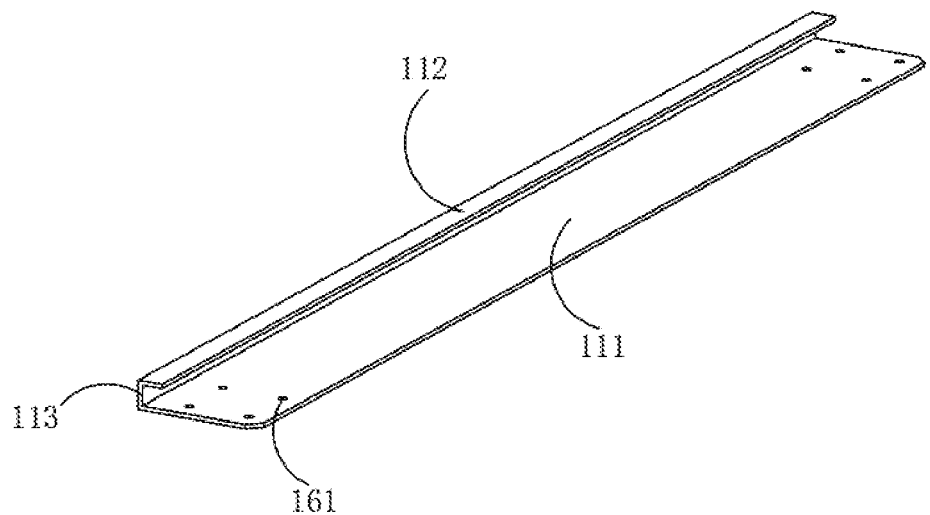
FIG. 3 is a schematic structural view of a first longitudinal edge portion in accordance with an embodiment of the present application.
Figure 4:
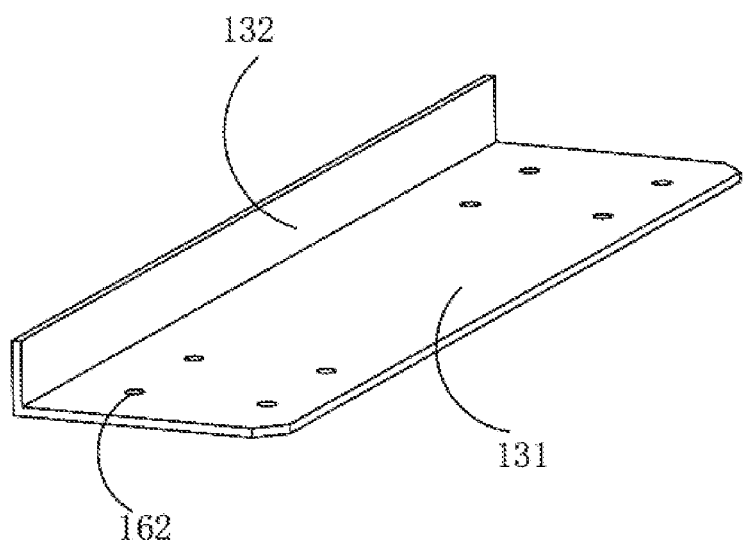
FIG. 4 is a schematic structural view of a first transverse edge portion in accordance with an embodiment of the present application.

As shown in FIGS. 2 and 3, the first transverse edge portion 11 includes a first support plate 111 and a first bent portion 112 disposed on the first support plate 111. The second transverse edge portion 12 includes a second support plate 121 and a second bent portion 122 disposed on the second support plate 121. The first lateral edge portion 13 includes a first retaining wall 132 disposed corresponding to a first end of each of the first transverse edge portion 11 and the second transverse edge portion 12. The second lateral edge portion 14 includes a second retaining wall 142 disposed corresponding to a second end of each of the first transverse edge portion 11 and the second transverse edge portion 12. The accommodation chamber 17 is enclosed by the first bent portion 112, the second bent portion 122, the first retaining wall 132, and the second retaining wall 142.

The first support plate 111 and the second support plate 121 are configured to support the optical element accommodated in the accommodation chamber 17. The first support plate 111 and the second support plate 121 are arranged side by side, and a surface of the first support plate 111 is flush with a corresponding surface of the second support plate 121. That is, a surface of the first support plate 111 for supporting the optical element is flush with a surface of the second support plate 121 for supporting the optical element.

It can be understood that the first bent portion 112 may be integrally formed with the first support plate 111. Alternatively, the first bent portion 112 and the first support plate 111 may be separately prepared first, and then the first bent portion 112 and the first support plate 111 are assembled. The second bent portion 122 may be integrally formed with the second support plate 121. Alternatively, the second bent portion 122 and the second support plate 121 may be separately prepared first, and then the second bent portion 122 and the second support plate 121 are assembled.

The first bent portion 112 may be disposed on an edge of the first support plate 111, and the first bent portion 112 has a same length as that of the first support plate 111. The second bent portion 122 may be disposed on an edge of the second support plate 121, and the second bent portion 122 has a same length as that of the second support plate 121. The length of the first bent portion 112, the first support plate 111, the second bent portion 122, and the second support plate 121 may also be selected according to size of an optical element and a display screen.

Specifically, the first bent portion 112 and the first support plate 111 cooperatively form a first slot 113. The second bent portion 122 and the second support plate 121 cooperatively form a second slot 123 provided opposite to the first slot 113.

In one embodiment, each of the first bent portion 112 and the second bent portion 122 is L-like in shape in cross-section.

It should be noted that when optical modules are being assembled, the first transverse edge portion 11 or the second transverse edge portion 12 is to be assembled with the first lateral edge portion 13 and the second lateral edge portion 14 first, then the optical element is inserted into the first slot 113 and the second slot 123, and the second transverse edge portion 12 is assembled with the first lateral edge portion 13 and the second lateral edge portion 14. The first slot 113 and the second slot 123 are provided to limit a position of the optical element from moving. At the same time, an area of top surfaces of both the first bent portion 112 and the second bent portion 122 can be increased, thereby improving a contact area of the backplate 10 and the display screen 40, so that a connection strength between the backplate 10 and the display screen 40 can be ensured. In this manner, sealants and cover frames of conventional backlight modules can be removed to reduce production cost.

Particularly, the first bent portion 112 and the second bent portion 122 may be exactly the same in shape to reduce the number of molds required.

Specifically, top surfaces of the first retaining wall 132 and the second retaining wall 142 are higher than that of the first bent portion 112 and the second bent portion 122, so that the first retaining wall 132 and the second retaining wall 142 can prevent the optical element from sliding out of the first slot 113 and the second slot 123.

As shown in FIGS. 2 to 5, the first lateral edge portion 13 further includes a first bottom plate 131 connected to the first support plate 111 and the second support plate 121, and the first retaining wall 132 is disposed on the first bottom plate 131. The second lateral edge portion 14 further includes a second bottom plate 141 connected to the first support plate 111 and the second support plate 121, and the second retaining wall 142 is disposed on the second bottom plate 141.

It should be noted that the first bottom plate 131 and the second bottom plate 141 are configured to connect the first transverse portion 11 and the second transverse portion 12. The first support plate 111 may be integrally formed with the first bottom plate 131. Alternatively, the first support plate 111 and the first bottom plate 131 may be separately prepared first, and then the first support plate 111 and the first bottom plate 131 are assembled. The second support plate 121 may be integrally formed with the second bottom plate 141. Alternatively, the second support plate 121 and the second bottom plate 141 may be separately prepared first, and then the second support plate 121 and the second bottom plate 141 are assembled.

The first support plate 111 may be disposed on an edge portion of the first bottom plat 131, and the second support plate 121 may be disposed on an edge portion of the second bottom plate 141.

In one embodiment, the first bottom plate 131 and the second bottom plate 141 are both disposed on rear sides of the first support plate 111 and the second support plate 121.

Specifically, both the first bottom plate 131 and the second bottom plate 141 may be connected to the first support plate 111 and the second support plate 121 by threaded connection, riveting, glue connection, welding, etc.

In one embodiment, each of the first support plate 111 and the second support plate 121 is provided with at least a first fixing hole 161, and each of the first bottom plate 131 and the second bottom plate 141 is provided with at least a second fixing hole 162 corresponding to the first fixing hole 161. Connect the first bottom plate 131 and the second bottom plate 141 with the first support plate 111 and the second support plate 121 by using bolts or rivets inserted in the first fixing hole 161 and the second fixing hole 162.

In one embodiment, the first support plate 111 is provided with a plurality of the first fixing holes 161 arranged in a direction along a long side of the first support plate 111. The second support plate 121 is provided with a plurality of the first fixing holes 161 arranged in a direction along a long side of the second support plate 121. The first bottom plate 131 is provided with a plurality of the second fixing holes 162 arranged in a direction along a long side of the first bottom plate 131. The second bottom plate 141 is provided with a plurality of the second fixing holes 162 arranged in a direction along a long side of the second bottom plate 141. In this manner, connection locations of where the first bottom plate 131 and the second bottom plate 141 are connected to the first support plate 111 and the second support plate 121 are adjustable, thereby the backplate 10 can be adjusted to have different sizes by a same group of assemblies, so that number of molds required can be reduced.

Specifically, a sum of width of the first support plate 111 and the second support plate 121 is less than or equal to a spacing between an inner side wall of the first bent portion 112 and an inner side wall of the second bent portion 122, so that difficulty in assembling the backplate 10 caused by an overlap of the first support plate 111 and the second support plate 121 can be prevented in a process of assembling the backplate 10 having different sizes.

It should be noted that a width of the first support plate 111 and a width of the second support plate 121 can be varied according to the actual needs. Based on a condition that the sum of width of the first support plate 111 and the second support plate 121 is less than or equal to a spacing between an inner side wall of the first bent portion 112 and an inner side wall of the second bent portion 122, the width of the first support plate 111 and the second support plate 121 can remain unchanged for the backplate 10 of different sizes.

Figure 5:
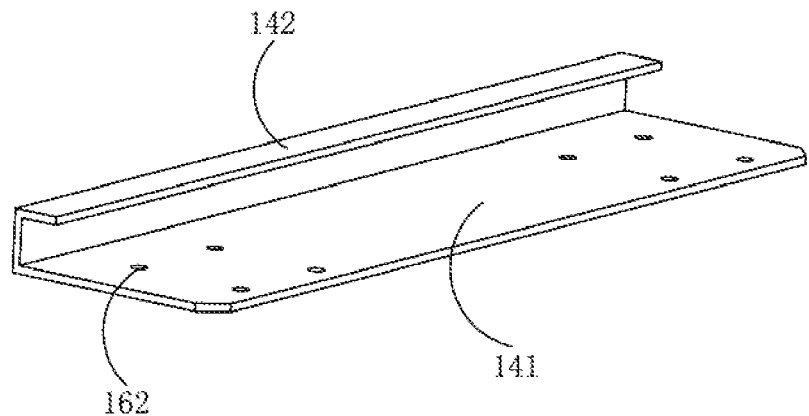
FIG. 5 is a schematic structural view of a second transverse edge portion in accordance with an embodiment of the present application.

In one embodiment, the first retaining wall 132 is strip-like in shape in cross-section (shown in FIG. 4), and the second retaining wall 142 is L-like in shape in cross-section (shown in FIG. 5).

Figure 6:
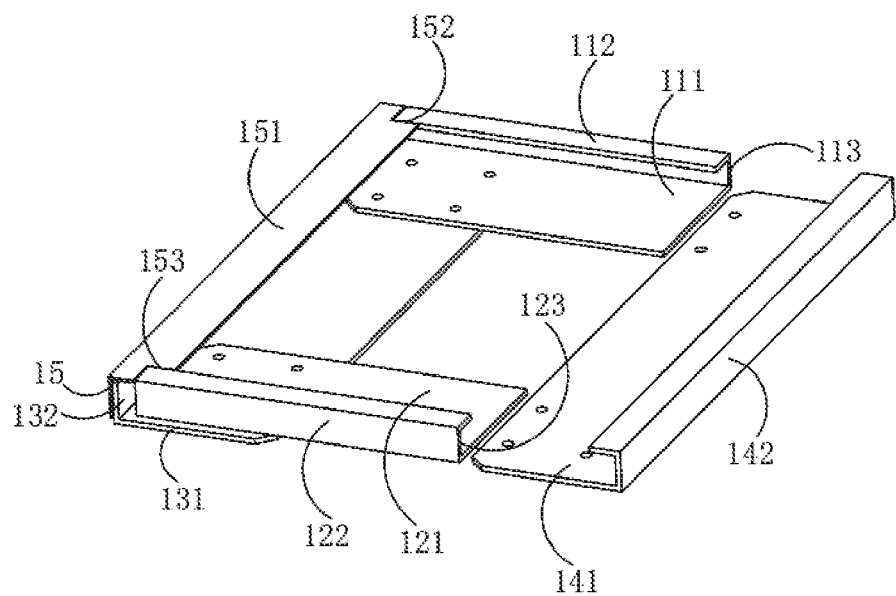
FIG. 6 is a schematic partial structural view of a backplate in accordance with an embodiment of the present application.

As shown in FIG. 6, in assembly, the second bottom plate 141 of the second retaining wall 142 is connected to the first support plate 111 and the second support plate 121, so that after the second lateral edge portion 14 is connected to the first transverse edge portion 11 and the second transverse edge portion 12, the optical element is inserted into the first slot 113 and the second slot 123 from a side away from the second retaining wall 142. At this time, the L-shaped second retaining wall 142 and the second bottom plate 141 cooperatively form a card slot for protecting an edge part of the optical element. A bottom surface of an inner side wall of the card slot is flush with bottoms of inner side walls of the first slot 113 and the second slot 123, and a top surface of the inner side wall of the card slot is flush with top surfaces of the inner side walls of the first slot 113 and the second slot 123. The first bottom plate 131 of the first transverse edge portion 11 is then connected to the first support plate 111 and the second support plate 121. The first retaining wall 132 is further provided to limit a location of the optical element, so that the optical element can be prevented from sliding out of the first slot 113 and the second slot 123. In addition, the first retaining wall 132 being strip-like in shape can facilitate assembly of the first transverse edge portion 11 and the first lateral edge portion 13 and the second lateral edge portion 14, and prevent the optical element from being damaged by collision with the first retaining wall 132 during assembly.

In one embodiment, the backplate 10 further includes an edge shielding portion 15 connected to the first lateral edge portion 13. The edge shielding portion 15 includes an edge shielding plate 151 disposed on a side of the first retaining wall 132 away from the first bottom plate 131. In this manner, the edge shielding plate 151 can function to protect an edge part of the optical element as well as increasing a contact area of the backplate 10 and the display screen.

It should be noted that the edge shielding portion 15 is L-like in shape in cross-section, and the edge shielding plate 151 has a same length as the first retaining wall 132. The edge shielding portion 15 and the first transverse edge portion 11 may be connected to each other by threaded connection, riveting, glue connection, welding, etc.

The edge shielding plate 15 provided with a first notch 152 and a second notch 153 located closed to the first bent portion 112 and the second bent portion 122, respectively. One end of a top of the first bent portion 112 is engaged with the first notch 152, and one end of a top of the second bent portion 153 is engaged with the second notch 153.

Figure 7:
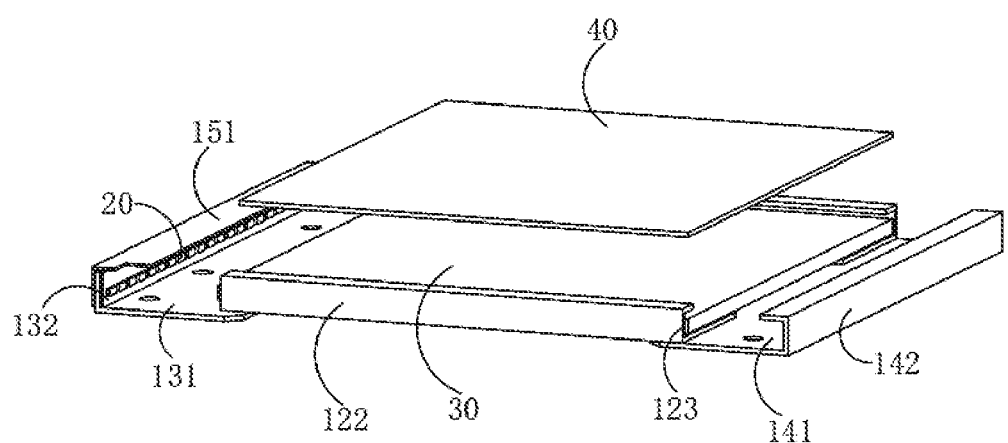
FIG. 7 is a schematic structural view of a display panel in accordance with an embodiment of the present application.

Based on the backplate 10, the present application further provides a display panel. As shown in FIG. 7, the display panel includes a display screen 40 and a backlight module disposed on a rear side of the display screen 40. The backlight module includes a light source 20, an optical element 30, and the backplate 10 in any one of the above-mentioned embodiments. The optical element 30 is insertably disposed between a first slot 113 and a second slot 123 provided by the backplate 10, and the light source 20 is disposed on an inner side of the backplate 10 and is located at a side portion of the optical element 30.

It should be noted that the backlight module is an edge-type backlight module. The light emitted by the light source 20 is incident on the optical element 30 from a side of the optical element 30, and then impinges on the display screen 40 after being scattered by the optical element 30. The light source 20 may be disposed on one or more of an inner side wall of the first retaining wall 132, the second retaining wall 142, the first bent portion 112, or the second bent portion 122. The optical element 30 may include one or more of optical films, such as a light guide plate and a diffuser plate.

In one embodiment, the light source 20 is disposed on the inner side wall of the first retaining wall 132, wherein a gap is formed between the first retaining wall 132 and the first bent portion 112 and the second bent portion 122, thereby preventing the light source 20 from being damaged by collision during an assembly process of the backplate 10.

In one embodiment, a reflective layer may be provided on an inner side of the edge shielding plate 151. An orthographic projection of the edge shielding plate 151 projected to the first bottom plate 131 covers an orthographic projection of the light source 20 projected to the first bottom plate 131, thereby facilitating light shielding by the edge shielding plate 151 against the light emitted from the light source 20, and avoiding light leakage from the edge shielding plate.

Specifically, the display screen 40 and the backlight module may be assembled by an optical adhesive. After applying the optical adhesive on a top surface of the optical element 30, a top surface of the first bent portion 112, a top surface of the second bent portion 122, a top surface of the second retaining wall 142, and a top surface of the edge shielding portion 151, the display screen 40 can be just attached to an optical adhesive layer.

The present invention has advantageous effects as follows: the backplate 10 is constructed with a plurality of modules, forming the accommodation chamber 17 for accommodating the optical element 30 of the display panel, and is capable of adjusting size of the accommodation chamber 17 without changing width of the first transverse edge portion 11, the second transverse edge portion 12, the first lateral edge portion 13, and the second lateral edge portion 14, but only with length adjustments of the first transverse edge portion 11, the second transverse edge portion 12, the first lateral edge portion 13, and the second lateral edge portion 14, so that the backplate is adapted to optical elements 30 of different sizes and to be assembled with displays 40 of different sizes. The modules having different lengths, such as the first transverse edge portion 11 and the other modules, can be produced with a same mold, thereby saving mold costs, reducing product development cycles, significantly lowering mold costs in a backplate production process, and facilitating production of small batch products and various types of products, as well as improving product response times.

In the above-mentioned embodiments, the description of each embodiment has its own emphasis. For parts that are not described in detail in an embodiment, reference may be made to related descriptions of other embodiments.

Specific examples are used in this article to describe the principles and implementation of the application. The descriptions of the above examples are only used to help understand the technical solutions and core ideas of the application; those of ordinary skill in the art should understand that they can still modify the technical solutions described in the foregoing embodiments, or equivalently replace some of the technical features; these modifications or replacements do not cause the essence of the corresponding technical solutions to deviate from the scope of the technical solutions of the embodiments of the present application.

What is claimed is:

1. A backplate, comprising:
   a first transverse edge portion extending along a first direction;
   a second transverse edge portion disposed opposite to the first transverse edge portion;
   a first lateral edge portion extending along a second direction; and
   a second lateral edge portion disposed opposite to the first lateral edge portion,
   wherein the first lateral edge portion is connected to the first transverse edge portion and the second transverse edge portion, the second lateral edge portion is connected to the first transverse edge portion and the second transverse edge portion, an accommodation chamber is defined by the first transverse edge portion, the second transverse edge portion, the first lateral edge portion, and the second lateral edge portion, the accommodation chamber is an opening, and the opening opens upwards and downwards;
   wherein the first transverse edge portion comprises a first support plate and a first bent portion disposed on the first support plate, the second transverse edge portion comprises a second support plate and a second bent portion disposed on the second support plate, the first lateral edge portion comprises a first retaining wall disposed corresponding to a first end of each of the first transverse edge portion and the second transverse edge portion, and the second lateral edge portion comprises a second retaining wall disposed corresponding to a second end of each of the first transverse edge portion and the second transverse edge portion;
   wherein the first lateral edge portion further comprises a first bottom plate connected to the first support plate and the second support plate, the first retaining wall is disposed on the first bottom plate, the second lateral edge portion further comprises a second bottom plate connected to the first support plate and the second support plate, and the second retaining wall is disposed on the second bottom plate;
   wherein the first bottom plate and the second bottom plate are both disposed under and in contact with the first support plate and the second support plate;
   wherein a top surface of the first retaining wall and a top surface of the second retaining wall are higher than a top surface of the first bent portion and a top surface of the second bent portion, respectively.

2. The backplate of claim 1, wherein the accommodation chamber is enclosed by the first bent portion, the second bent portion, the first retaining wall, and the second retaining wall.

3. The backplate of claim 2, wherein a first slot is defined between the first bent portion and the first support plate, and a second slot provided opposite to the first slot is defined between the second bent portion and the second support plate.

4. The backplate of claim 1, wherein each of the first support plate and the second support plate is provided with a first fixing hole, and each of the first bottom plate and the second bottom plate is provided with a second fixing hole corresponding to the first fixing hole.

5. The backplate of claim 1, wherein the first retaining wall is strip-like in shape in cross-section.

6. The backplate of claim 5, further comprising an edge shielding portion connected to the first lateral edge portion, wherein the edge shielding portion comprises an edge shielding plate disposed on a side of the first retaining wall away from the first bottom plate.

7. The backplate of claim 1, wherein the second retaining wall is L-like in shape in cross-section.

8. A display panel, comprising:
   a display screen; and
   a backlight module disposed on a rear side of the display screen and comprising a light source, an optical element, and the backplate of claim 1,
   wherein the optical element is insertably disposed between a first slot and a second slot provided by the backplate, and the light source is disposed on an inner side of the backplate and is located at a side portion of the optical element.

9. A backplate, comprising:
   a first transverse edge portion extending along a first direction;
   a second transverse edge portion disposed opposite to the first transverse edge portion;
   a first lateral edge portion extending along a second direction; and
   a second lateral edge portion disposed opposite to the first lateral edge portion,
   wherein the first lateral edge portion is connected to the first transverse edge portion and the second transverse edge portion, the second lateral edge portion is connected to the first transverse edge portion and the second transverse edge portion, an accommodation chamber is defined by the first transverse edge portion, the second transverse edge portion, the first lateral edge portion, and the second lateral edge portion, the accommodation chamber is an opening, and the opening opens upwards and downwards;

wherein the first transverse edge portion is integrally formed with one of the first longitudinal edge portion or the second lateral edge portion, and the second transverse edge portion is integrally formed with another one of the first lateral edge portion or the second lateral edge portion;

wherein the first transverse edge portion comprises a first support plate and a first bent portion disposed on the first support plate, the second transverse edge portion comprises a second support plate and a second bent portion disposed on the second support plate, the first lateral edge portion comprises a first retaining wall disposed corresponding to a first end of each of the first transverse edge portion and the second transverse edge portion, and the second lateral edge portion comprises a second retaining wall disposed corresponding to a second end of each of the first transverse edge portion and the second transverse edge portion;

wherein the first lateral edge portion further comprises a first bottom plate connected to the first support plate and the second support plate, the first retaining wall is disposed on the first bottom plate, the second lateral edge portion further comprises a second bottom plate connected to the first support plate and the second support plate, and the second retaining wall is disposed on the second bottom plate;

wherein the first bottom plate and the second bottom plate are both disposed under and in contact with the first support plate and the second support plate;

wherein a top surface of the first retaining wall and a top surface of the second retaining wall are higher than a top surface of the first bent portion and a top surface of the second bent portion, respectively.

10. The backplate of claim 9, wherein the accommodation chamber is enclosed by the first bent portion, the second bent portion, the first retaining wall, and the second retaining wall.

11. The backplate of claim 10, wherein a first slot is defined between the first bent portion and the first support plate, and a second slot provided opposite to the first slot is defined between the second bent portion and the second support plate.

12. The backplate of claim 10, wherein the first support plate and the second support plate are arranged side by side, and a surface of the first support plate is flush with a corresponding surface of the second support plate.

13. The backplate of claim 9, wherein each of the first support plate and the second support plate is provided with a first fixing hole, and each of the first bottom plate and the second bottom plate is provided with a second fixing hole corresponding to the first fixing hole.

14. The backplate of claim 9, wherein the first retaining wall is strip-like in shape in cross-section.

15. The backplate of claim 14, further comprising an edge shielding portion connected to the first lateral edge portion, wherein the edge shielding portion comprises an edge shielding plate disposed on a side of the first retaining wall away from the first bottom plate.

16. The backplate of claim 9, wherein the second retaining wall is L-like in shape in cross-section.

* * * * *